United States Patent

Haug

[15] 3,703,126
[45] Nov. 21, 1972

[54] INTERNAL COMBUSTION ENGINE PISTON

[72] Inventor: Albert Haug, Montmorency, France

[73] Assignee: Societe d'Etudes de Machines Thermiques, Saint-Denis, France

[22] Filed: Feb. 1, 1971

[21] Appl. No.: 111,308

[30] Foreign Application Priority Data

Feb. 16, 1970    France......................7005425

[52] U.S. Cl..................................92/186, 123/41.35
[51] Int. Cl..............................................F01b 31/08
[58] Field of Search ......92/186, 238, 187; 123/41.35

[56] References Cited

UNITED STATES PATENTS

| | | | |
|---|---|---|---|
| 2,865,348 | 12/1958 | Kramer | 123/41.35 |
| 2,742,883 | 4/1956 | Smith | 92/186 |
| 2,428,602 | 10/1947 | Yingling | 92/186 |
| 1,756,211 | 4/1930 | Reid | 123/41.35 |

FOREIGN PATENTS OR APPLICATIONS

| | | | |
|---|---|---|---|
| 479,138 | 12/1951 | Canada | 123/41.35 |
| 196,043 | 5/1938 | Switzerland | 92/238 |
| 310,362 | 8/1933 | Italy | 92/238 |
| 373,299 | 5/1932 | Great Britain | 92/238 |

Primary Examiner—Milton Kaufman
Assistant Examiner—R. H. Lazarus
Attorney—Kenyon & Kenyon Reilly Carr & Chapin

[57] ABSTRACT

Modular cast iron piston for an internal combustion engine, with oil cooling of at least the head and some of the piston ring grooves, and comprising an annular cooling chamber located in the piston head in proximity at least to the groove of the first piston ring and corresponding in configuration to said piston head and promoting the transmission of thrust forces directly to the boss forming the bearing of the connecting-rod small end.

1 Claim, 7 Drawing Figures

PATENTED NOV 21 1972 3,703,126
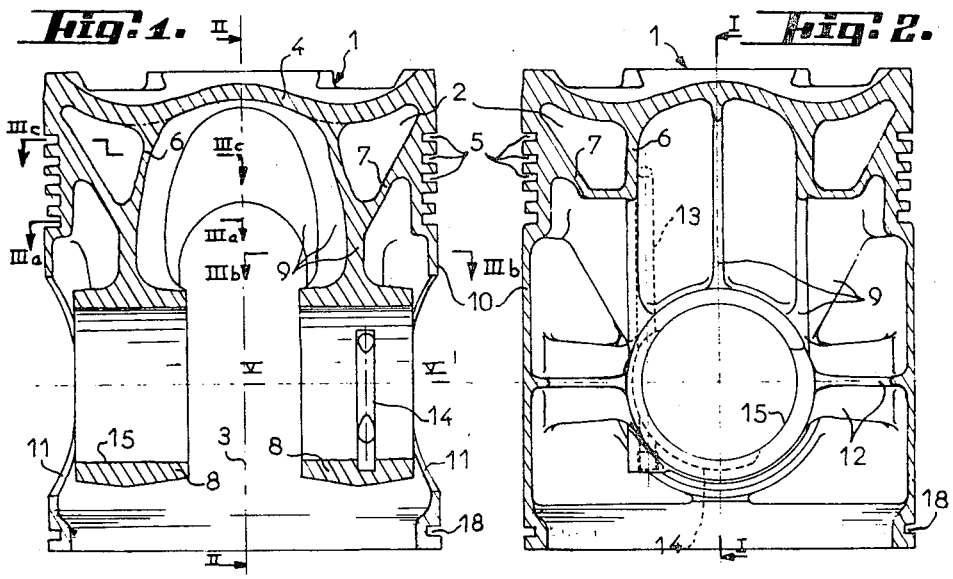
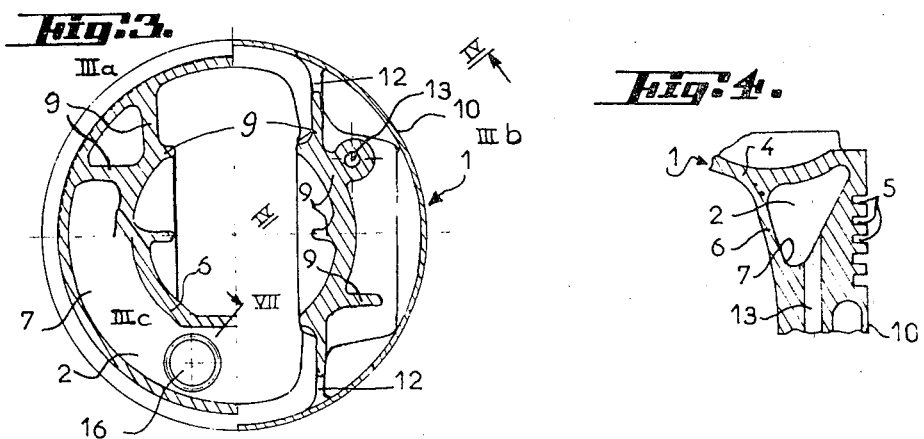
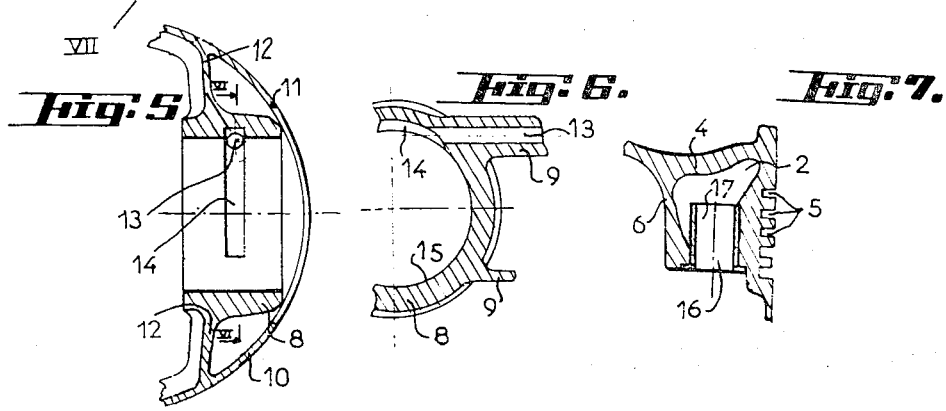
INVENTOR
ALBERT HAUG
BY
Kenyon & Kenyon Reilly Carr & Chapin
ATTORNEYS

INTERNAL COMBUSTION ENGINE PISTON

The present invention relates generally to and has essentially for its object a heat engine piston, especially a piston for an internal combustion engine, in particular of the Diesel type or the like, as well as the various applications and uses resulting from the working thereof and the systems, assemblies, machines, mechanisms, equipments and plants provided therewith.

Pistons are already known which are cast in a single moulded piece, in particular from spheroidal graphite cast iron, of the trunk or sleeve type or the like provided with forced liquid cooling, in most cases by way of lubricating oil circulation, at least of the bottom and of some of the piston ring grooves. Pistons are also known which comprise an annular liquid cooling chamber.

The present invention has mainly for its purpose to combine and associate the technical advantages resulting separately or individually from each of the two said known types of pistons, while at the same time eliminating most of their inherent drawbacks, by creating a piston resulting from the combination of the said two known types and characterized by an annular liquid cooling chamber of a type known per se, located in the piston head in proximity at least to the first piston groove and the shape of which corresponds in configuration to the said piston head, thus favoring the transmission of the pushing force to the boss forming the bearing for the connecting-rod small end.

The invention will be better understood and other purposes, features, details and advantages thereof will appear more clearly from the following explanatory description, with reference to the appended diagrammatic drawings given solely by way of example, illustrating one form of embodiment of the invention and wherein:

FIG. 1 is a longitudinal axial sectional view, upon the line I—I of FIG. 2, of a piston according to the invention;

FIG. 2 is a similar sectional view upon the line II—II of FIG. 1;

FIG. 3 gathers together three different partially sectional views, namely: an upper left quarter sectional view upon the line IIIa—IIIa of FIG. 1, a right half sectional view upon the line IIIb—IIIb of FIG. 1 and a lower left quarter sectional view upon the line IIIc—IIIc of FIG. 1;

FIG. 4 is a fragmentary sectional view upon the line IV—IV of FIG. 3, showing the oil intake or feed duct for the annular cooling chamber;

FIG. 5 is a fragmentary half-sectional view upon the line V—V of FIG. 1,

FIG. 6 is a fragmentary sectional view upon the line VI—VI of FIG. 5; and

FIG. 7 is a fragmentary sectional view upon the line VII—VII of FIG. 3, showing the return channel for the oil proceeding from the said annular chamber.

According to the example of embodiment illustrated in FIGS. 1 and 2, the piston 1 is a body moulded in one piece from nodular or spheroidal graphite cast iron, comprising in the head thereof an annular oil cooling chamber 2 surrounding the longitudinal axis 3 of the piston and directly adjacent, on the one hand, to the head 4 of the latter and, on the other hand, at least to the first grooves 5 for the sealing rings. The cross-sectional shape of the chamber 2 is so designed as to closely correspond in shape to the inner configuration of the piston head, i.e. of the transverse wall 4 forming the head end of the piston and of the side wall of its skirt in immediate proximity to the piston rings.

The annular chamber 2 is defined on its radially inner side by a side wall 6 which is substantially vertical in some of its portions, as seen in FIG. 2, or at least approximately vertical in other portions, as appears from FIG. 1. The inner wall 7 of the chamber 2 is preferably generally inclined from top to bottom by extending from the interior to the exterior of the said chamber.

The boss 8 forming the bearing for the connecting-rod small end is made in two portions, respectively a right portion and a left portion (see FIGS. 1 and 5) which are suspended from the piston head through the medium of ribs and webs 9 which are at least approximately parallel with the longitudinal axis 3 of the piston and are interconnected mainly at the inner side wall 6 and lower wall 7, respectively, of the annular chamber 2, leaving the opposite projecting ends of the boss 8 clear of the inner side wall adjacent to the piston skirt 10, so that the said ends remain spaced from the said skirt and from the edges of the openings 11 passing through the skirt 10 in substantially confronting relationship to the said ends of the boss 8. Such an arrangement offers the advantage of allowing the piston skirt to remain cylindrical in that region, whereas in the prior piston types it is oval in shape in order to allow for thermal deformations. Transverse ribs 12 connect bilaterally the said portions of the boss 8 to the corresponding inner side wall of the skirt 10 (FIGS. 2, 3 and 5). The said ribs 9 from which the boss 8 is suspended may be distributed in two sets extending respectively in generally parallel relationship to two perpendicular axial plane/directions, whereas the said transverse ribs comprise ribs which are substantially parallel with the longitudinal axis of the piston and ribs which are substantially parallel with a transverse plane normal to the said axis.

The annular chamber 2 may extend entirely all along the periphery of the piston and all around its longitudinal axis, or it may extend only on a circumferential portion about the said axis by being thus divided, for instance, into several chamber sections or portions separated by partitions. The annular chamber 2 may be supplied with cooling oil by at least one lateral oil intake or supply duct 13 extending substantially in parallel relationship to the longitudinal axis 3 of the piston and opening from below into the annular chamber 2 (see FIGS. 2 to 4). The duct 13 extends in a solid portion forming a stiffening rib 9, through one of the portions of the boss 8 and opens substantially tangentially into a circumferential open slot 14 provided on the inner face of the boss bore 15 and forming a channel or a slot for the lubrication of the said bore (see FIGS. 1, 2 and 5, 6). The return of the cooling oil proceeding from the annular chamber 2 takes place through at least one lateral duct 16 (FIGS. 3 and 7) which is substantially parallel with the longitudinal axis 3 of the piston and which opens from below into the annular chamber 2 through the lower wall 7 of the latter by passing preferably on the side of the boss 8. The oil return duct 16 is arranged for instance between two transverse ribs 12, substantially by the side of or near the inner end of one of the portions, for instance the right portion, of the boss 8.

There may be provided several, for instance two, separate oil intake ducts such as 13 and/or several, for instance two, return ducts such as 16, in order to improve or promote the oil flow. The upper end openings of such ducts are arranged at locations ensuring optimum flow of the fluid. In case there are provided only two, respectively intake and return ducts, the upper end openings of the intake duct 13 and the return duct 16 are preferably at least approximately diametrally opposed with respect to the axis 3 of the piston and the return duct 16 is advantageously located in a zone where the transmission of the stresses is reduced to a minimum.

There may be provided at least one device serving to keep constant at least one predetermined minimum level or amount of oil in the chamber 2. This device is constituted preferably by a pipe of the like 17 prolonging upwardly the upper end opening of each return duct 16 and possibly of each intake duct 13, so as to project by its open free end into the chamber 2 over at least a portion of the height of the latter.

The lower end of the piston skirt 10 is advantageously provided with at least one groove 18 for a scraper ring or the like.

The configuration of the internal structure of the piston therefore allows easy access to the internal cavity of the latter and the new improved structure proposed offers the advantage of allowing for efficient cooling of the piston by ensuring an optimum and rational distribution of the force fluxes to which the piston is subjected. On the other hand, the central portion of the upper face of the piston, which is not subjected directly to forced cooling through the medium of the annular chamber 2 may be cooled by way of oil sprinkling by means of jets or nozzles mounted on the connecting-rod small end through which the oil arrives.

Of course, the invention is by no means limited to the form of embodiment described and illustrated which has been given by way of example only. In particular, it comprises all the means constituting technical equivalents to the means described as well as their combinations, should the latter be carried out according to the spirit of the invention.

What is claimed is:

1. An integral plunger trunk-type piston cast in one piece from spheroidal graphite cast iron for an internal combustion engine and including a closed ended head portion having a transverse top end crown wall and a side wall formed with ring-receiving grooves, a hollow open ended skirt portion depending from said head portion, and a pair of transversely spaced bushing-like wrist pin bearing bosses located inside of said skirt portion in symmetrical relation to a plane passing through the longitudinal axis of the piston and formed with journal bores aligned diametrically of said skirt portion, wherein the improvement consists in the combination comprising: a substantially annular cooling-oil splash chamber provided in said head portion in coaxial relation thereto and adjacent to said top end wall and to at least the first ring-receiving groove; a pair of spaced longitudinal arcuate webs depending from said top end wall in parallel symmetrical relation to said piston axis with their concave sides facing each other and being connected to the tops of said pin bearing bosses for supporting same so as to leave a freely projecting outer end on each boss; each boss being connected to said skirt portion by a pair of transverse webs located in substantially registering relationship on opposite sides of said boss nearer its inner end than its outer end and extending in substantially parallel relation to said plane; said skirt portion having its wall formed with a pair of diametrically opposed openings in substantial coaxial relation to said journal bores, said openings being of a diameter larger than the outside diameters of the outer ends of said bosses and the outer ends of said bosses being spaced inwards from the inside wall of said skirt portion and clear of the edges of said openings; said chamber being bounded by said top end wall whereas the upper portion of each arcuate longitudinal web forms the radially inner wall of said chamber; the radially outer wall of said chamber being substantially conical and generally inclined uniformly inwards from top to bottom while extending from above the first ring-receiving groove down to a level above the last ring-receiving grooves of said head portion; each arcuate longitudinal web being connected to the side wall of said head portion on either side of an axial plane passing through the axis of said journal bores, by a pair of ribs extending at right angles to each other adjacent to one end portion of said web, each rib being of generally triangular contour and connecting with the bottom portion of the side wall of said head portion and of said chamber; at least one oil inlet duct extending in substantially parallel relation to said piston axis and opening at its top end from below into said annular chamber while opening at its bottom end into an open circumferential lubrication groove formed in the bore of one boss in substantially tangential relationship therewith; and at least one oil outlet duct formed in the bottom of said annular chamber in at least approximately diametrically opposed relation to said inlet duct; said inlet duct extending through a radially outward projecting longitudinal formation integral with one of said arcuate webs and each duct terminating at its top end in a tubular extension projecting into said annular chamber over one portion of the height of the latter.

* * * * *